(No Model.) 4 Sheets—Sheet 1.
J. THOMSON.
METHOD OF AND APPARATUS FOR MAINTAINING A PROPORTIONAL FLOW OF FLUIDS THROUGH SEPARATE CHAMBERS.
No. 476,098. Patented May 31, 1892.
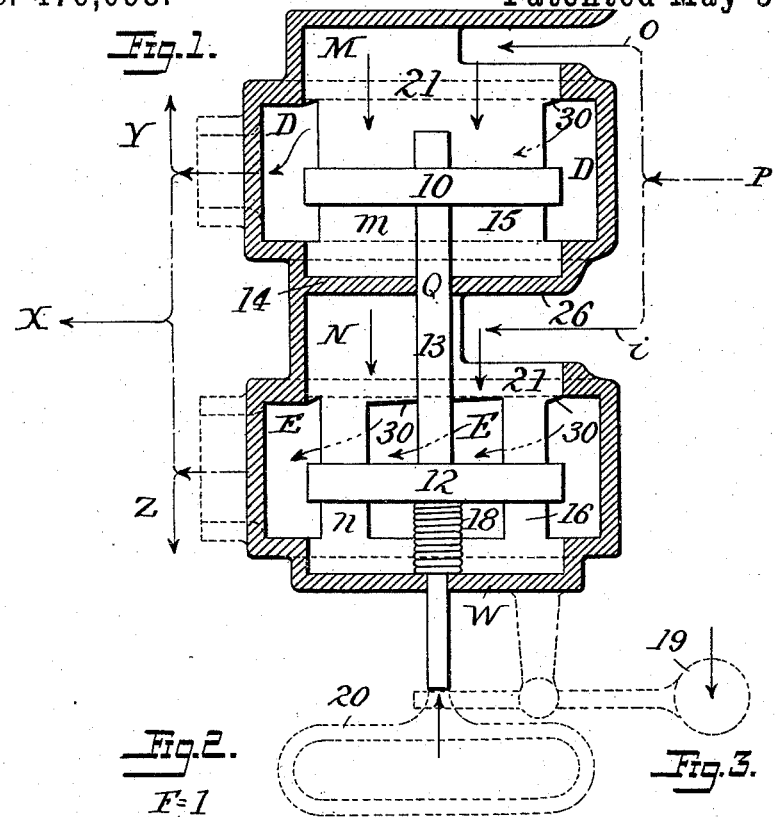
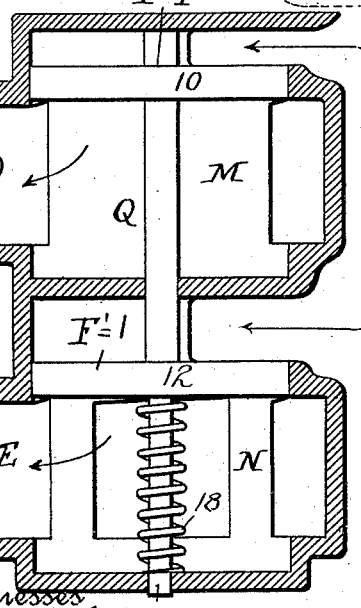
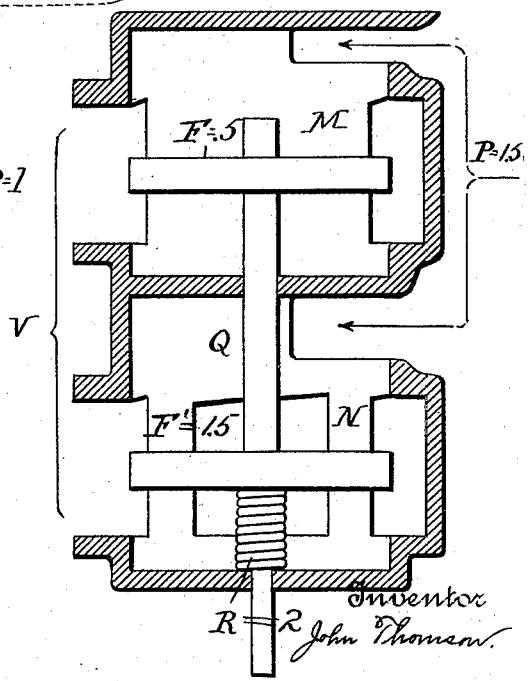
Witnesses
Jno. G. Hinkel
H. S. McArthur
Inventor
John Thomson
By Foster & Freeman
Attorneys (No Model.) 4 Sheets—Sheet 2.
J. THOMSON.
METHOD OF AND APPARATUS FOR MAINTAINING A PROPORTIONAL FLOW OF FLUIDS THROUGH SEPARATE CHAMBERS.
No. 476,098. Patented May 31, 1892.
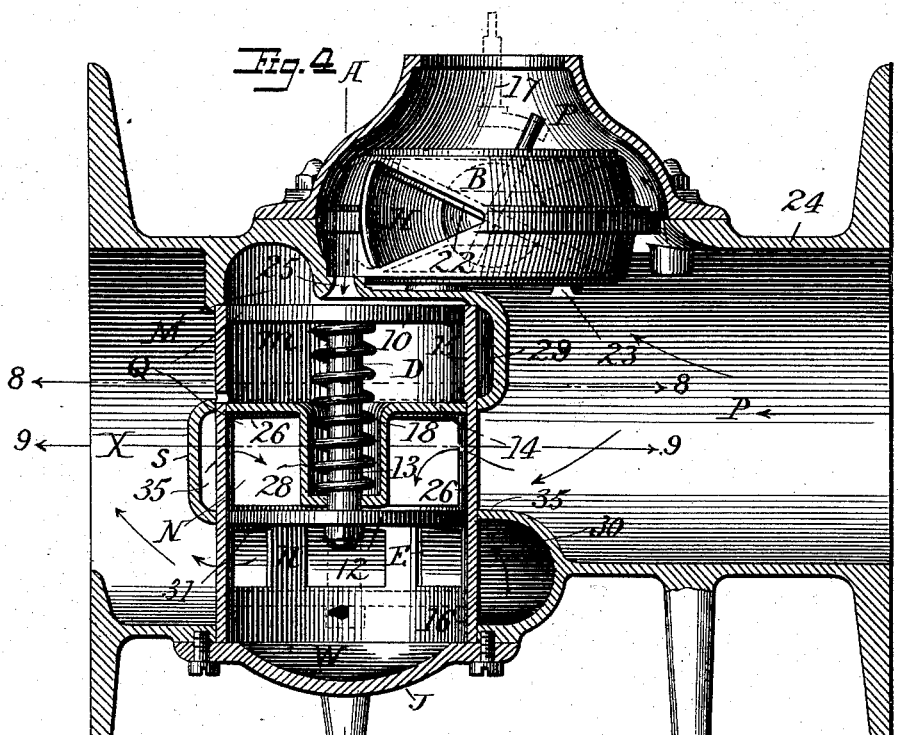
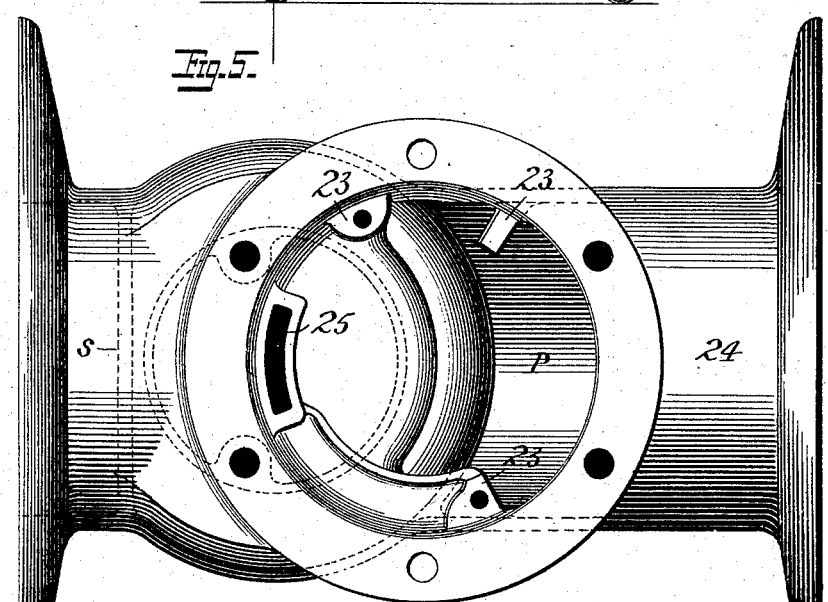

(No Model.) 4 Sheets—Sheet 3.

J. THOMSON.
METHOD OF AND APPARATUS FOR MAINTAINING A PROPORTIONAL FLOW OF FLUIDS THROUGH SEPARATE CHAMBERS.

No. 476,098. Patented May 31, 1892.

Witnesses
Inventor
John Thomson.
By Foster & Freeman
Attorneys (No Model.) 4 Sheets—Sheet 4.
J. THOMSON.
METHOD OF AND APPARATUS FOR MAINTAINING A PROPORTIONAL FLOW OF FLUIDS THROUGH SEPARATE CHAMBERS.
No. 476,098. Patented May 31, 1892.
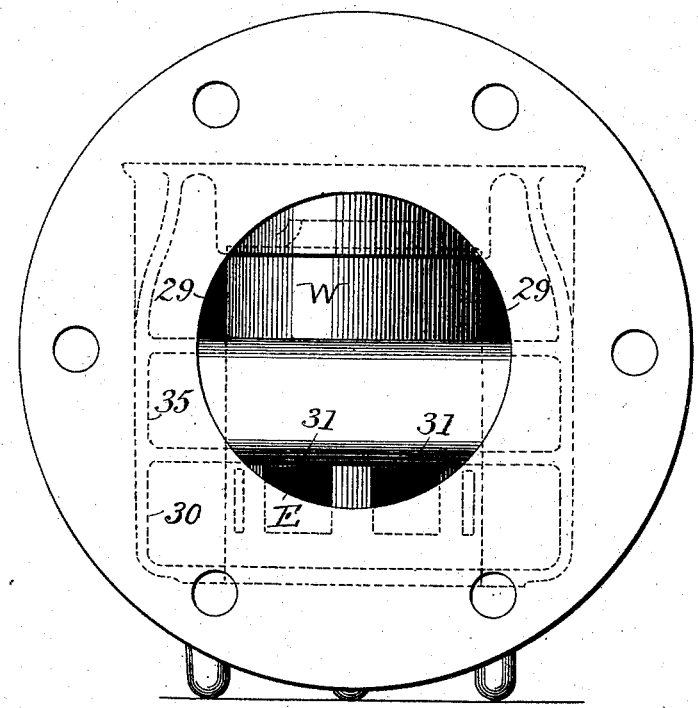
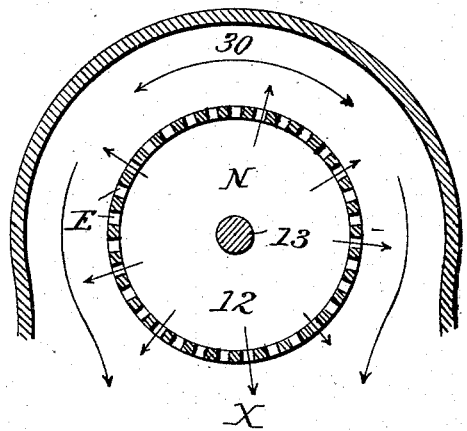

UNITED STATES PATENT OFFICE.

JOHN THOMSON, OF BROOKLYN, ASSIGNOR TO THE THOMSON METER COMPANY, OF NEW YORK, N. Y.

METHOD OF AND APPARATUS FOR MAINTAINING A PROPORTIONAL FLOW OF FLUIDS THROUGH SEPARATE CHAMBERS.

SPECIFICATION forming part of Letters Patent No. 476,098, dated May 31, 1892.

Application filed October 1, 1891. Serial No. 407,416. (No model.)

*To all whom it may concern:*

Be it known that I, JOHN THOMSON, a citizen of the United States, residing at Brooklyn, Kings county, State of New York, have invented certain new and useful Improvements in Methods of and Apparatus for Maintaining a Proportional Flow of Fluids Through Separate Chambers, of which the following is a specification.

My invention relates to the measurement of fluids in that class of meters in which there are two streams, the volume of one of which is registered, and has for its object to insure an abnormal inlet-pressure in a meter whenever the rates of flow between the streams is accidentally varied, and also automatically vary the areas of the ports, according to variations in the total delivery, while maintaining constant their ratio of delivery.

My invention further consists of certain details of construction set forth hereinafter, and illustrated in the accompanying drawings, for which invention I have filed an application in Canada on the 13th day of October, 1891, Serial No. 58,143.

Figure 6:
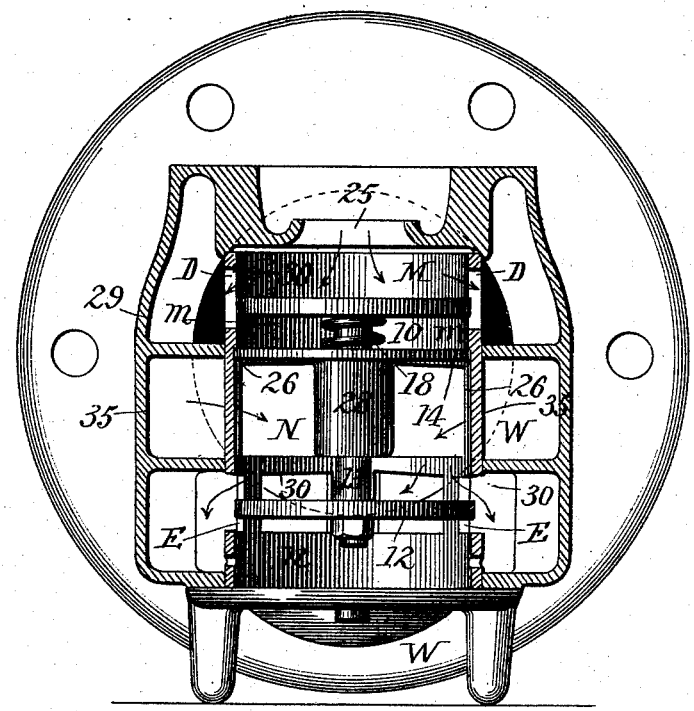
Figure 7:
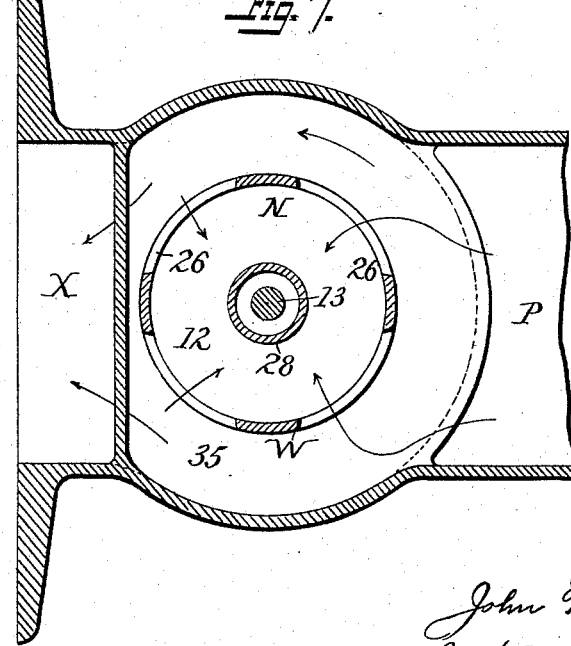

Figures 1, 2, and 3 are schematic diagrams presented to graphically illustrate the dominant features and principles. Fig. 4 is a vertical center section and elevation illustrating the application of the invention in proportional water-meters. Fig. 5 is a top plan view developed from Fig. 4, except that the measuring-casing thereof is omitted. Fig. 6 is a vertical transverse section through the valve-casing and the main casing on line A of Fig. 4, viewed toward the left-hand side thereof. Fig. 7 is a horizontal section through the valve, the main casing, and the valve-casing on line 9 of Fig. 4, looking downward therefrom. Fig. 8 is an end elevation developed from the left-hand side of Figs. 5 and 6; and Fig. 9 is a horizontal sectional view of the valve-casing and valve therein, showing a modification.

When a proportional water-meter is used to secure the measurement of large volumes of fluid flowing rapidly, slight obstructions in one or the other of the two streams in such meter will not materially affect the final result; but when the flow is greatly reduced, especially in using a meter of great maximum capacity, the difference of pressures at the inlet and outlet ends of the meter is not sufficient to maintain the ratio of flow of the two streams and the registration is erroneous.

By the use of usual forms of automatically-adjusted valve devices to reduce the areas of the ports as and when the volume of fluid delivered approximates the minimum flow a greater difference of pressure between the inlet and outlet chambers may be maintained; but in such case any obstructions to the flow of one stream will increase the pressure, open the valve, and increase the discharge through the other stream, leading to imperfect measurements and preventing any such increase of pressure in the obstructed stream as would tend to remove the obstruction. To avoid these objections, I automatically reduce the sizes of the discharge-ports as the volume of water approximates its minimum flow, but without increasing the flow through one stream if the other is obstructed, so that in such case to momentarily abnormally increase the head or inlet pressure, which thereby becomes sufficient to overcome and remove the obstruction, but without varying the relative areas of the ports, whatever may be the extent to which they have been opened or closed by the total discharge then taking place, thus preserving the ratio of delivery under normal operations. I have devised different means whereby to effect this result, but prefer to make use of a valve device regulating the flow of discharge of both streams through the meter.

In the construction shown in the drawings there is an outer casing 24, having an inlet-chamber P, outlet-chamber X, and a valve device, having a cylindrical casing inclosing two chambers M N, the former with discharge-ports D, and the latter with discharge-ports E, and inclosing a valve Q.

Referring primarily to the diagrammatic Figs. 1, 2, and 3, the two chambers M N are to be situated between the main inlet-chamber P and the main outlet-chamber X. The said chambers M N will be herein termed "intermediate chambers." They are to be each directly connected to the main inlet-chamber, as shown by arrows *o i*. The intermediate chambers are formed by the single valve-casing, and the transverse wall or septum 14 thereof, in which is formed a bearing for the spindle of the valve. The delivery from the intermediate chambers through the ports may be directly connected to the main outlet-chamber X, or be severally deflected to distinct receiving-chambers, as indicated by the arrows Y Z, Fig. 1.

The parts comprised in the valve Q are the valve-pistons 10 12, mounted upon and rigidly attached to the spindle 13. The valve-pistons are to be closely but freely fitted to the respective cylindrical bearings 15 16 of the intermediate chambers.

Means are provided whereby the valve is moved in one direction by a pressure independently of that of the fluid to be measured. I prefer an artificial resilient resistance to the movement of the valve under pressure of said fluid, and a preferable resilient resistance applied to the valve is a spring 18; but by the term "resistance" may be included a counterweight, as 19, a float, as 20, or reversing the conditions to utilize the weight of the valve, as by turning the figures of the drawings upside down. The thrust of the resistance is to be such that under the static condition the valve-pistons will close the ports. Thus they will be forced to lap the edges of the ports as, say, to the position indicated by the dotted lines 21, Fig. 1.

The connection of and pressure from the main inlet-chamber is to and upon similar sides of both valve-pistons. This is in a direction for the pressure upon both pistons to oppose the resistance. Hence to open the ports and place them simultaneously in communication with the chamber P the valve is actuated by the pressure transmitted to both pistons from the main inlet-chamber, which action of the valve will require such a measure of power as to be capable of overcoming the thrust of the single resistance.

In the full lines of Fig. 1 the valve is indicated at half-throw, thereby exposing above the valve-pistons half of the area of the ports.

The resistance is preferably, although not necessarily, so proportioned that except when the discharge approximates the minimum the excess of pressure in main chamber P over X, due to such maximum rates of velocity, is so much greater than the artificial resistance that the valve is thrown open to its full extent, and for the time being the action may be regarded as if no valve device was used; but with a reduced rate of flow the maximum of artificial resistance is greater than the difference of pressure between P and X, and the valve, according to this difference of pressure between the chambers P and X and that of the artificial resistance, is shifted to close the ports to a greater or less extent. If the artificial resistance is represented by 2 and indicated by R, a difference of pressure (indicated by 1 at P) will exert a pressure of 1 at F, and also 1 at F', and if the respective surfaces of the valve-pistons are also each equal to one unit of area then the said difference of pressure will counterbalance the resistance 2 and the valve will be in equilibrium and stationary; but if when the valve is in any position there is an obstruction to the flow of fluid in the path of one of the streams—say from the inlet P to the chamber M—there will be a reduction of pressure upon the valve at F; but the valve will not thereby be materially shifted because, although this increases the pressure at F, it is instantly correspondingly increased at F' by increasing the head or raising the difference of pressure between the main chambers P and X. Thus, as is shown in Fig. 3, if the obstruction at F decreases the pressure therein to .5 the pressure at F' will momentarily increase approximately to, say, 1.5 or to such an extent as to practically hold the valve stationary, because such obstruction virtually diminishes the area of the valve, and as the artificial resistance is constant this will call for an increased difference of pressure between P and X, or, as in the pressures just assumed, the pressure at F and F' will be the sum of .5 + 1.5, or 2, equal to the resistance shown by R. Thus the valve is still in equilibrium and remains stationary, although there is an unequal disposal of pressures thereon. The discharge-area at E is not increased, and the excess of pressure accumulated in the chamber P instantly overcomes the resistance in the obstructed channel. The pressures upon the valve will be again equally disposed and the proportional flow is resumed. It will be seen that this governing action of the two streams takes place without varying the areas of the ports or materially or for any length of time moving the valve, but that the latter is left free to move instantly to change the total areas of the ports, but not the relative areas, whenever the total volume discharged is varied; but the rate of flow in practice varies to a great degree, (in a two-inch meter from ten feet to twelve hundred feet per hour,) and by the means described I automatically regulate the sizes of the ports D and E, so as to reduce them proportionally to the extent to which the flow is reduced beyond a certain limit, and yet if when the ports are throttled and any accident varies the flow through one port the effect will not be to enlarge the other and permit the water to escape through a greater area, but by practically maintaining the original area it will be still further throttled and automatically momentarily increase the difference of pressure at the inlet side to such an extent as will be sufficient to overcome the obstruction, after which the proportional flow will be resumed, but without any change in the relative areas of the ports. It will doubtless be seen that any change in the relation of the volumes delivered would not affect the principle just enunciated.

The practical utility of this method is in the accurate measurement or recording of the quantity delivered through one of the streams. Thus by deflecting a minor quantity, say, of steam, this might be condensed, and the water of condensation being measured would represent the fractional part of the whole, or by inserting suitable automatic mechanism the apparatus becomes a recording device suitable for gas or liquid measurement, and as the latter purpose is the more prominent I will now describe in detail the apparatus devised for this duty and constituting a proportional water-meter of, say, four inches nominal capacity. In such size of meter the relation of the measuring-chamber to the whole volume is here assumed as one is to thirty-two. That is, with a delivery of thirty-two units of measure one unit will have passed through the measuring-casing B, while thirty-one units will have passed through the intermediate chamber N without actual mechanical displacement. Thus the total volume is inferred by measurement of a minimum aliquot part thereof. The relation is predicted upon the proper maximum delivery of the measuring device, which in this instance is of the nominal half-inch capacity and may be worked up to, say, 2.5 cubic feet a minute. Hence 2.5×32=80 cubic feet as the maximum of such a size of meter, ample for the most severe service conditions. In other words, when the meter is worked up to its maximum rate of discharge of the total volume of eighty feet, delivered in one minute, 2.5 will have been discharged through the measuring-casing and the upper intermediate chamber M, while 77.5 feet will have been delivered through the lower intermediate chamber M.

The type of measuring device here shown is the disk action, comprised of the casing B, disk 22 therein, similar to that of my patent, No. 427,485, of May 6, 1890; but I do not by this mean to limit myself exclusively to the use thereof, as other measuring devices might be substituted. Nevertheless the disposal and construction of this measuring device with respect to the entire apparatus bear certain relations which I regard as of the first importance.

The measuring mechanism is supported on projecting lugs or seats 23 of the lower casing 24 and is entirely contained within the main inlet-chamber P, thereby avoiding intermediate connecting-channels in that the inlet-port H, leading to the measuring-chamber, is supplied directly from the surrounding space of which said port may be said to be a part. The consequence of this is that the course of the minor volume really begins within the chamber of the measuring-casing, so that the entire delivery of the main inlet-chamber is to the upper intermediate chamber M by way of the measuring-chamber and the short connecting-port 25, while the major stream flows to the intermediate openings 26 of the valve-casing and thence to the lower intermediate chamber N.

The usual connection to the register is indicated in the dotted lines 17 of Fig. 4, and it is by such means properly standardized that the total delivery of the apparatus is recorded. In this illustration the resilient resistance is a simple helical spring 18, applied to the valve-spindle, whose thrust is between the bottom of the recess 28, formed in the septum, and the lower side of the upper valve-piston. The advantage of this disposal is that the action of the spring is perfectly central and that it may be of ample length without adding to the extent of the valve-casing. The intermediate chambers may be said to have positive spaces above the valve-pistons and negative spaces $m\ n$ below, the latter spaces being connected at all times with the main outlet-chamber X through the ports of the valve-casing. This is required for the single purpose of permitting the water that is displaced by the valve-pistons to be ejected into the main outlet-chamber.

In the present instance the valve-casing W is provided with two upper or minor ports D and six lower or major ports E, Figs. 4 and 6, which are preferably disposed equidistant circumferentially to discharge into the cored channels 29 30, that encircle the valve-casing. The advantage of this is that the flow from the intermediate chambers is balanced both in force and direction and cannot produce any detruding effect upon the valve.

An additional object of the circular channels is to present a practically uniform resistance not only to the total effluent volumes from each of the intermediate chambers but to each and every one of the ports leading thereto and therefrom, which object is realized when the jets that are discharged through the ports impinge upon a medium of practically uniform density.

It is to be observed that the inflowing volume to chamber N, Figs. 4 and 7, is from P to the circular channel 35, thence through the radial openings 26 in the valve-casing. It is also to be observed that the valve-pistons so lap the ports that when the flow is first started the operation of the measuring mechanism will not be at the aforesaid relation, but may be approximately nearly equal, as one is to two, in that the only escape for the fluid until the ports are uncovered is that due to the displacement of the valve-pistons from the negative spaces $m\ n$ of the intermediate chambers, and thence to the main outlet-chamber X. Hence as the volume moved by each piston is equal this insures that the measuring mechanism shall be put into operation at a very low rate of flow. The advantage of this lies in the well-known fact that the measuring device of a meter will, if once started, frequently operate correctly at a rate of flow lower than that which will primarily put the device into action, in that the adhesion of the mechanism when at rest is greater than that of the friction of motion.

As shown in the drawings, the intention is to afford such an area through the ports less than that of the intermediate chambers, whereby to utilize the ports as if they were throttling-diaphragms between the intermediate chambers and the main outlet-chamber. This I would designate as "natural throttling," in that it begins when the valve will have been depressed to the limit of its movement. This period of natural throttling is to begin when the draft is so great that the natural difference of pressure between the main outlet-chamber and the intermediate chambers at this and all higher rates of flow shall be such that any local disturbance in the measuring mechanism may be safely neglected, because not likely to have any material effect upon the performance of the measuring device and the proper proportionate delivery of the valve-casing ports. Therefore the function of the valve during such a period of natural throttling would be as if suspended as the pressure in the intermediate chambers upon the valve-pistons would be greater than the opposal of the resilient resistance.

The advantages of producing the aforesaid natural throttling are that the thrust of the resilient resistance needs be but slight and that the movement of the valve is not only limited in extent, but takes place throughout the comparatively low rates of flow, being at rest when the velocities are highest. By forming the ports in a detachable valve-casing they may thus be more readily machined accurately to obtain the exact relative ratio. The theoretically-perfect condition in this particular would appear to be when the ratio would be obtained by ports whose dimensions were exactly equal—that is, with the aforesaid relation and having two ports leading from the upper intermediate chamber M—then there should be two multiplied by thirty-one equals sixty-two ports, of equal dimensions, formed in the lower intermediate chamber N, as shown in Fig. 9; and such a construction may well be followed out in the smaller sizes of meters, although in the larger sizes this would prevent the passage of bulky foreign material, and to this extent would be a disadvantage. The result aimed at, however, may be reached by so constricting the area of the lower ports that the hydraulic friction due to the edges of the apertures shall be relatively as if through spaces of uniform dimensions.

Theoretically the power of the resilient resistance need be but just sufficient to overcome the friction of the measuring device at low rates of flow; but an excess of power therein is not detrimental, provided the obstruction to the flow is not seriously increased thereby.

A condition of the utmost importance to be observed in the design of this meter and which is fairly indicated in the drawings is that the effective area afforded for the influent volumes to the intermediate chambers shall be of greater extent than the area of the discharging-ports that the supply thereto may always be in excess of the demand to insure the proper operation of the valve and valve-casing ports.

The importance of a proper relative position of the valve-pistons, the ports of the valve-casing, and the main casing is not to be overlooked, as when disposed, as shown in the drawings, with the axial center of the valve-casing at right angles to the downward line of flow, the valve is perfectly poised and any foreign material carried in by the flow will be carried off through the ports without lodging to interfere with the proper action of the device.

The features just described may be modified to suit varying requirements and conditions, or some might even be omitted, and I do not limit myself to the precise details of disposal and construction herein shown.

Without limiting myself to the precise construction and arrangement of parts shown and described, I claim—

1. The method, substantially as hereinbefore described, of controlling the operations of a proportional meter, the same consisting in automatically increasing or decreasing the areas of the ejection-ports controlling the measured and unmeasured streams when the flow in both streams is uniformly varied, and in automatically maintaining a fixed area of the discharge-ports upon the variation of the flow in but one of the streams.

2. A proportional meter provided with a self-acting compound valve having separate faces of equal areas mounted in separate chambers, arranged to automatically increase or decrease the areas of the ejection-ports controlling the separate streams when the flow in both streams is uniformly varied and to prevent the increase or decrease of the port areas upon the variation of the flow in but one of the streams, the said valve and its chambers being disposed to receive the discharge from the measuring mechanism, substantially as specified.

3. The combination, in a proportional meter, of separate receiving-chambers provided with ejection-ports, a valve having separate faces of equal areas controlling said ports, a fixed septum between said faces of the valve, and a spring for resisting the movements of the valve under the pressure of either or both of the two streams, the said receiving-chambers and the valve being located to receive the discharge from the measuring mechanism, substantially as specified.

4. In a proportional meter, a casing, a compound valve arranged within said casing to control the ports for the discharge of the major and minor streams, and a registering device having a port communicating with the inlet-chamber of the casing, and another port 25 communicating with one of the chambers of the compound valve, substantially as described.

5. In a proportional meter, a valve-casing having separate chambers, with a compound piston-valve and a resilient resistance therein, two ports disposed circumferentially, and circular channels coinciding with the ports, whereby the channels will receive and deliver to and from the ports radially.

6. The combination, with the main external casing, of a measuring device, the valve-casing provided with separate chambers, the compound piston-valve, the parts of which are contained in said chambers, the resilient resistance, and the valve-casing ports leading from the chambers, the valve-casing and attachments being contained within the main external casing, substantially as set forth.

7. The combination, with the valve-casing having two sets of superimposed ports and a compound piston-valve therein, of circular receiving and discharging channels coinciding with said ports, substantially as specified.

8. In a proportional meter, the combination, with two discharge-ports leading from separate chambers, of a valve-casing, a compound piston-valve having its parts operating in separate chambers of the valve-casing, and a resilient resistance in the casing for the said valve, substantially as specified.

9. The combination, with the main casing and measuring device therein, of the compound piston-valve, the resilient resistance, the intermediate chambers, each containing a port, of the valve and the valve-casing ports communicating with said chambers, substantially as described.

10. The combination, with the main casing having inlet and outlet chambers P X, with the measuring mechanism connected within the main case, the valve-casing containing the intermediate chambers D and E, the ports in the valve-casing, the compound piston-valve, and resilient resistance inclosed in said valve-casing, substantially as described.

11. The combination, with the main casing, of the valve-casing having separate ported chambers when the axial center of the said valve-casing is disposed at a right angle to the line of flow through the main chambers and directly beneath the measuring mechanism to receive the flow therefrom, substantially as specified.

In testimony whereof I have signed my name to this specification in the presence of two subscribing witnesses.

JOHN THOMSON.

Witnesses:
  F. L. FREEMAN,
  JOS. W. KAY.